Oct. 19, 1965  R. B. DOORLEY ETAL  3,212,451
SURFACE SENSING DEVICE

Filed March 2, 1962  7 Sheets-Sheet 2

INVENTORS.
Richard B. Doorley
Paul S. Settle, Jr.
BY
Webb, Mackey & Burden
THEIR ATTORNEYS Oct. 19, 1965 R. B. DOORLEY ETAL 3,212,451
SURFACE SENSING DEVICE
Filed March 2, 1962 7 Sheets-Sheet 3

INVENTORS.
Richard B. Doorley
Paul S. Settle, Jr.
BY
Webb, Mackey & Burden
THEIR ATTORNEYS

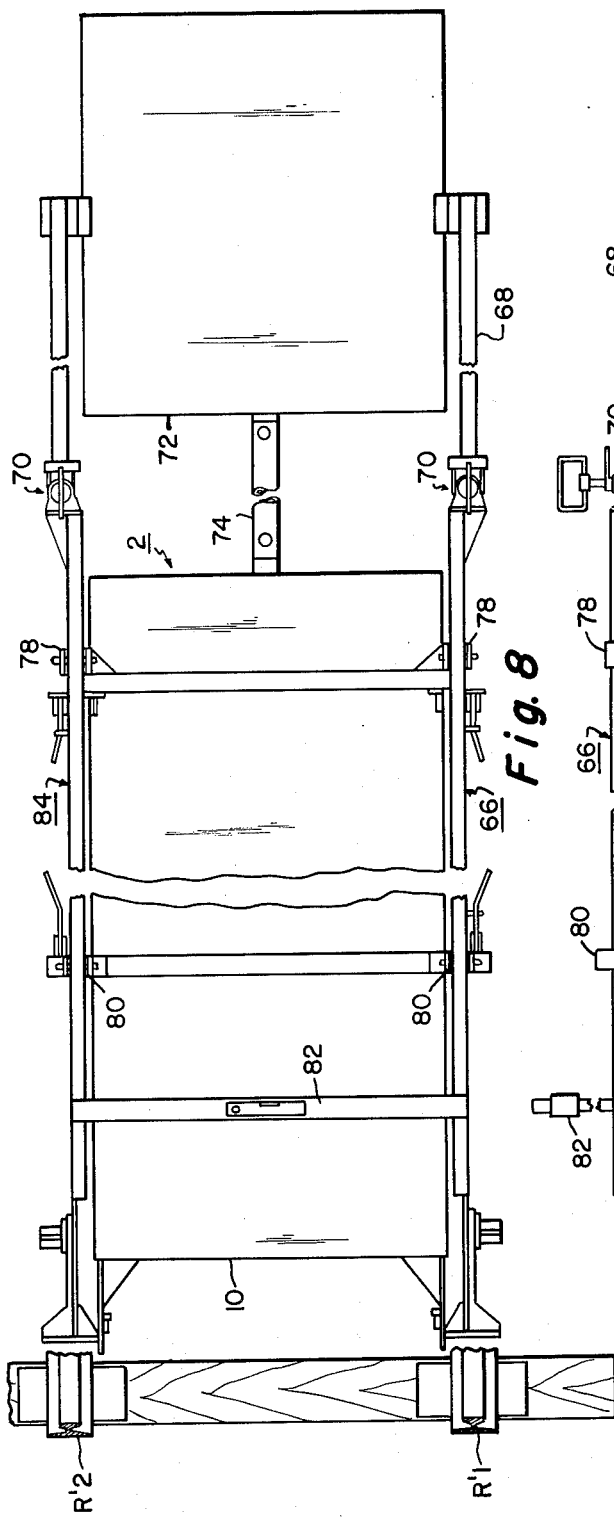
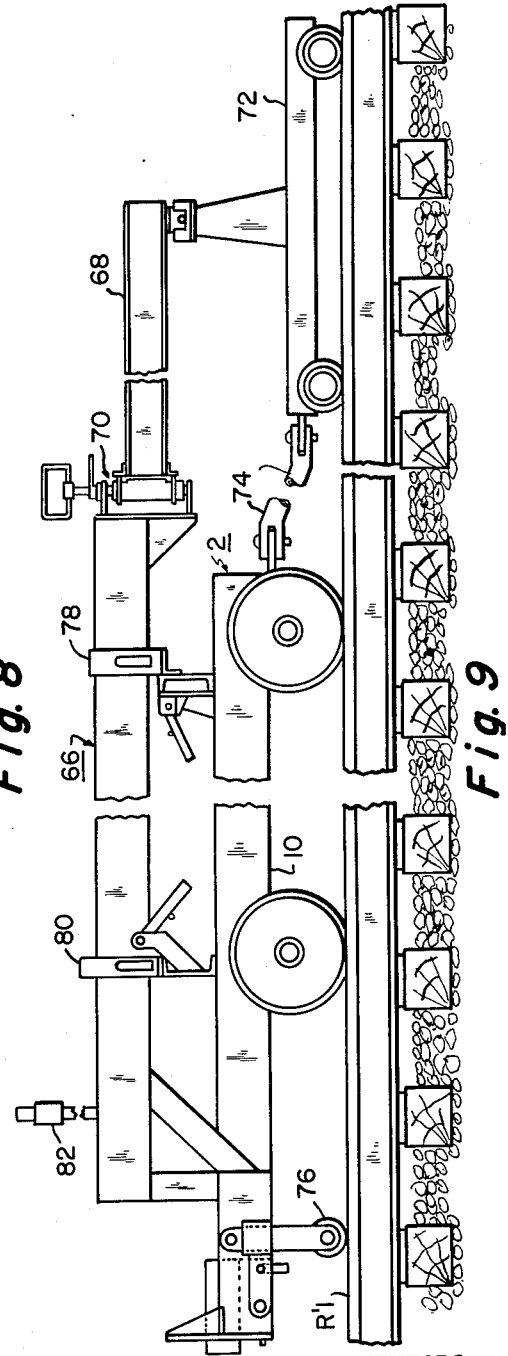

Oct. 19, 1965 R. B. DOORLEY ETAL 3,212,451
SURFACE SENSING DEVICE
Filed March 2, 1962 7 Sheets-Sheet 5

INVENTORS.
Richard B. Doorley
Paul S. Settle, Jr.
BY
Webb, Mackey & Burch
THEIR ATTORNEYS INVENTORS.
Richard B. Doorley
Paul S. Settle, Jr.
BY
THEIR ATTORNEYS INVENTORS.
Richard B. Doorley
Paul S. Settle, Jr.
BY
Webb, Mackey Burden
THEIR ATTORNEYS United States Patent Office
3,212,451
Patented Oct. 19, 1965

3,212,451
SURFACE SENSING DEVICE
Richard B. Doorley, Brentwood Borough, and Paul S. Settle, Jr., Fox Chapel Borough, Pa., assignors to Railway Maintenance Corporation, Pittsburgh, Pa., a corporation of Pennsylvania
Filed Mar. 2, 1962, Ser. No. 177,125
23 Claims. (Cl. 104—7)

This invention relates to a surface sensing device and more particularly to a combination surface sensing device, surfacing mechanism and control system therefor.

This invention is an improvement over the surface sensing device and surfacing mechanism described in application Serial No. 32,961 filed May 31, 1960 and assigned to the same assignee.

In road surfacing, road grading, runway surfacing and railway track surfacing, there is a need for a sensing mechanism should preferably sense the elevation or surface at predetermined reference points. The sensing mechanism should preferably sense the elevation or grade of the surface in front of and the cross level or cross slope of the surface to the side of the machine with which it is associated. The sensing mechanism should be self-contained and not require grade markers or grade indicators or the like. With a sensing mechanism of this type, the construction of new roads and the resurfacing of existing roads would be greatly simplified. Substantial savings could be effected in the amount of top surfacing material now being used in road construction. For example, the present practice in bringing roads to a final grade is to use excessive amounts of top surfacing material to fill in the irregularities caused by the irregularities existing in the subgrade. The use of an accurate sensing mechanism in preparing the subgrade would eliminate the irregularities in the subgrade or much of the field surveyed references and simplify the top surfacing operation. Our improved sensing mechanism, hereinafter described, provides the desired accurate measurements of the elevation of the surface at predetermined reference points both forwardly of the machine with which it is associated and also laterally of the machine.

Our surface sensing device has found particular utility when used with a railway track smoothing machine and will be described in conjunction therewith. It should be understood, however, that our surface sensing device can be used with road grading machines and any surfacing machines which require a continuous comparison between a resurfaced area and an adjacent area that requires surfacing.

A railway track smoothing machine removes the undulations and irregularities from a railway track by raising both of the rails a predetermined distance.

A surface sensing device is associated with the railway track smoothing machine and is arranged to indicate the elevation of at least one of the rails beneath the machine and at a location in front of the machine. The sensing device determines the amount of raise required for the rail adjacent the front of the machine to blend that portion of the track with previously raised track behind the machine and thereby obtain a smooth, level track. In co-pending application S.N. 32,961, there is disclosed a railway track smoothing machine that has a pair of sensing beams connected thereto and extending longitudinally therefrom in overlying relation with one of the rails. Sensing means are included to sense the angular relationship between the longitudinal axis of the machine frame and the reference rail therebeneath; the angular relationship between the reference beams and the angular relationship between the reference beams and the longitudinal axis of the vehicle frame. The surface sensing device utilizes two or more rail reference points in front of the machine, a rail reference point at the jack position and one rail reference point on the previously surfaced track behind the jack position. A comparison is made between the highest reference point in front of the machine and the rear reference point. A signal is produced from this comparison which is proportional to the amount of raise required to bring the rail at the jack reference point up to a position wherein the reference point at the jack position will be in the same plane as the rear reference point and the higher forward reference point. The track, at the rear reference point and the jack reference point, are therefore in the same plane and this plane is aligned with the higher forward reference point. The track between the jack reference point and the front reference point will not of necessity be in planar relation with the portion of the track between the jack reference point and the rear reference point.

The railway track smoothing machine disclosed in co-pending application S.N. 32,961 utilizes the machine frame as the rigid member that connects the rear reference point and the jack reference point. It has been found that there is a substantial distortion in the frame of the machine during the jacking and tamping operation. This distortion affected the accuracy of the sensing device. We have discovered by employing the reference beam which is separate from or free floating relative to the machine frame that the problems experienced by the distortion of the machine frame are eliminated. The separate reference beam is thus insulated from the machine and remains stable during the jacking and tamping operation. The separate reference beam is not subjected to as much vibration as is experienced by the machine frame and results in more accurate sensing of the track condition and hence smoother track.

In track raising, it is highly desirable to raise the track as quickly as possible. The track smoothing machine is constructed to tamp the ballast beneath the tie at the location where the jacks raise the rail. The truck smoothing machine then advances along the track and tamping machines follow to tamp the ballest beneath the other ties. Where the smoothing machine serves as the rear reference point for the sensing device, the length of track that the track smoothing machine may advance between jacking operations is limited because the rear reference point must be positioned on previously raised track for proper orientation of the sensing device. With certain machines, this incremental advance of the machine is limited to about seven ties. We have discovered by isolating the reference beam from the track smoothing machine and positioning the rear support for the reference beam a substantial distance behind the machine, that it is now possible to advance the track smoothing machine at greater increments. It is now possible to perform the jacking operation at rail joints and centers and thereby increase the speed at which the track is raised without sacrificing the desired accuracy of obtaining smooth, level track and proper grade.

Railway track is raised to grade by hydraulically operated jacks secured to the track smoothing machine. The actuator for the jack is a conventional manually controlled three position valve. When the valve is operated, hydraulic fluid, at a fixed volume per unit time, is introduced into the jack cylinder, thus extending the piston at a fixed linear rate. The sensing device disclosed in co-pending application S.N. 32,961 included a visual indicator means in the control compartment of the track smoothing machine. When the indicator deviated from a null position, this indicated to the operator that a track raise was required. The operator would then manually operate the hydraulic valve while observing the indicator. As the indicator approaches the null position, the operator would stop the jacking operation. The operator then, by jogging the valve, would attempt to obtain a null position on the indicator. This manual operation of the jacking valve to obtain smooth track at predetermined grade both required unusual skill and considerable experience. After the reference or grade rail was brought to grade, the operator followed substantially the same procedure to bring the other rail to the same elevation on tangent track or predetermined super-elevation on curves. A spirit level connected to the machine served as an indicator means for determining the relative position of the "cross level" rail. It is apparent that the heretofore described manual operation of the jacks on the track smoothing machine was time consuming with quality of work dependent on the skill of the operator and limited the amount of track that could be serviced in any given period of time. We have discovered a control system for a track smoothing machine that couples the reference rail sensing device to the jack adjacent that rail and automatically controls the valve mechanism to raise the rail to the desired grade elevation. The control system automatically reduces the rate of flow of hydraulic fluid to the jack cylinder as the rail approaches the desired grade elevation and stops the flow of hydraulic fluid when the rail has reached the desired grade. Our control system also actuates the jack for the "cross level" rail and controls the raise of this rail in a similar manner until the "cross level" rail is brought to the desired grade.

We have also discovered a cross level device that may be employed with our control system. The cross level device includes a level sensing mechanism that transmits a signal proportional to the angular deviation of the cross level device from a predetermined lateral plane. Our cross level device includes an adjustment mechanism that may be employed to insert a correction factor where super-elevation requirements between the rails is desired.

Our new and improved control system includes pressure control means which ensures the jacks operating simultaneously throughout most of the raising operation rather than one jack at a time. This pressure control means reduces the line distortion to a minimum. The pressure control means includes a pressure actuated switch in each jack control circuit. As the jacks are extended one jack strikes the ballast adjacent the rail somewhat earlier than the other because of road bed irregularities. When the jacks were manually controlled, the operator could not sense the jack striking the road bed until that jack had raised the rail or track out of level. The operator then had to stop the jack and raise the track on the other side level with the first and then continue jacking. The raising of one side considerably ahead of the other tends to slew the track laterally requiring that it be realigned later.

With our improved system, the first jack to build up pressure is deenergized until the second builds up pressure, then both jacks raise the track together.

Our control system also includes means to sense the settling of the jacks in the ballast during the tamping operation. If one jack begins to settle, the sensing means will reactivate its corresponding valve to further extend the jack and thereby again raise the rail to the predetermined elevation.

It is readily apparent with our new and improved surface sensing device, cross level sensing device and control system, that the time required to raise and smooth the railway track is greatly reduced and the entire operation is accomplished with greater accuracy than was heretofore possible.

Our invention comprises a new and improved construction and combination and parts and their operative relation to each which will be described more fully hereinafter and the novelty of which will be particularly pointed out and distinctly claimed.

In the accompanying drawings to be taken as part of this specification, we have fully and clearly illustrated our invention, in which drawings:

FIGURE 8 is a fragmentary top plan view of the machine illustrated in FIGURE 6.

FIGURE 9 is a fragmentary view in side elevation illustrating the reference beam of FIGURE 6 in detail.

Our invention will be described in conjunction with apparatus for leveling and smoothing railway track. It should be understood, however, that our improved sensing device can be employed with road grading or surfacing machines with equal facility. In road grading or surfacing, the blade of the bulldozer or leveling device would be controlled by the surface sensing device, and the control system would function with the machine in motion rather than stationary as is the case with the apparatus for leveling and smoothing railway track.

Figure 7:
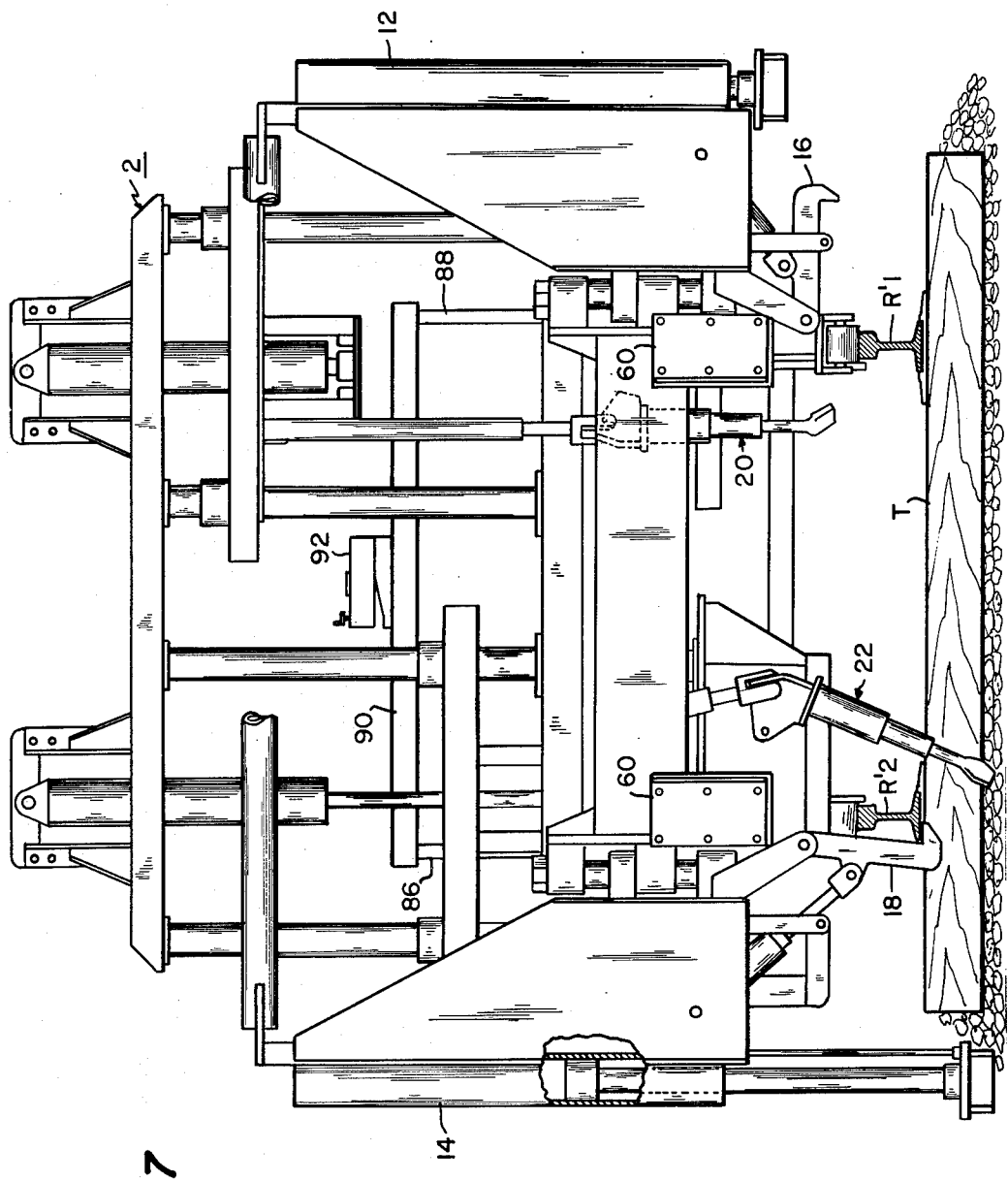
FIGURE 7 is a view in section taken along the line VII—VII of FIGURE 5.

For a better understanding of the concept of our surface sensing device, the embodiment of our improved railway smoothing machine illustrated in FIGURES 5, 7 and 10 will be described. A railway track smoothing machine generally designated by the numeral 2 has a generally rectangular frame 10. A pair of jacks 12 and 14 (FIGURE 7) are secured to the front end of the frame 10 in a suitable manner. The jacks 12 and 14 are illustrated in FIGURE 7 with jack 12 in a retracted position and jack 14 in an extended position. A pair of dogs 16 and 18 are associated with the jacks 12 and 14 and are operable to extend beneath the rails R'1 and R'2. In FIGURE 7, dog 16 is indicated in retracted position and dog 18 is indicated in an extended position beneath rail R'2. The dogs 16 and 18 are operatively associated with the machine frame 10 to clamp the frame 10 to the rails R'1 and R'2 during the track raising operation. The rails R'1 and R'2 are raised by means of the jacks 12 and 14. For example, in FIGURE 7, as jack 14 extends, the rail R'2 is raised. The railway track smoothing machine 2 includes tampers 20 and 22 which are arranged to tamp the ballast beneath the tie T. In FIGURE 7, tamper 20 is illustrated in a retracted position and tamper 22 is illustrated in an extended operative position. The jack tamper apparatus is of well known construction as shown in Hursh and McWilliams Patent No. 2,843,055.

A reference beam generally designated by the numeral 24 is pivotally connected to the frame 10 (FIGURE 5) above the rear wheel 25 and extends forwardly therefrom. The front end of reference beam 24 is supported a predetermined distance above the rail R'1 by a wheeled support member 26. The front end of reference beam 24 is pivotally secured to the rear end of a first sensor beam 28 by a pivot connection generally designated by the numeral 30. A carriage or cart 32 supports the front end of reference beam 28 a predetermined distance above the rail R1. A second sensor beam 34 is pivotally connected at its rear end to the front end of first sensing beam 28 by means of a pivot connection generally designated by the numeral 36. The front end of the second sensor beam 34 is supported at a predetermined elevation above the rail by a cart or carriage 38. The pivot connection 30 includes a sensor device operable to indicate relative vertical angularity between the reference beam 24 and sensor beam 28. Similarly, pivot connection 36 includes a sensor device operable to indicate relative vertical angularity between sensor beam 28 and sensor beam 34. Thus, the relative planar relationship of reference beam 24 and the rail therebeneath can be determined by the relative position of reference beam 24 and sensor beams 28 and 34.

*Theory of surface smoothing*

In FIGURES 1, 2, 3 and 4, there are illustrated various conditions of an undulating surface and the manner in which the undulations are removed and the surface made smooth and planar. For convenience, the machine schematically illustrated, is the railway track smoothing machine illustrated in FIGURES 5 and 10. It should be understood, however, that the theory and concepts hereinafter discussed are equally applicable to other surface smoothing or grading machines.

Figure 1:
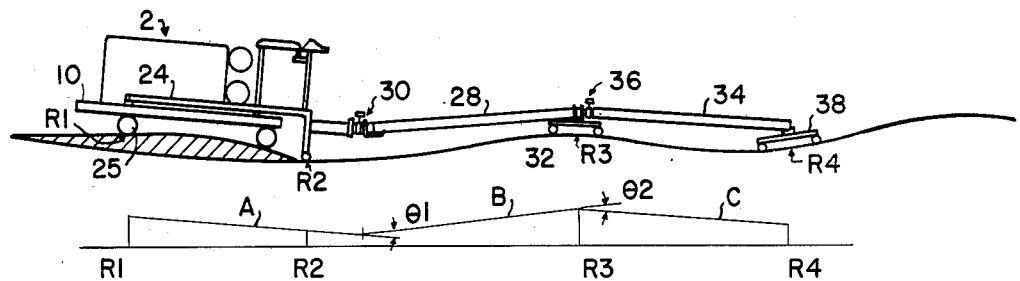
FIGURES 1, 2, 3 and 4 are schematic drawings of our invention illustrating the operation of a portion of our surface sensing device and the manner in which the surface is brought to grade.
Figure 2:
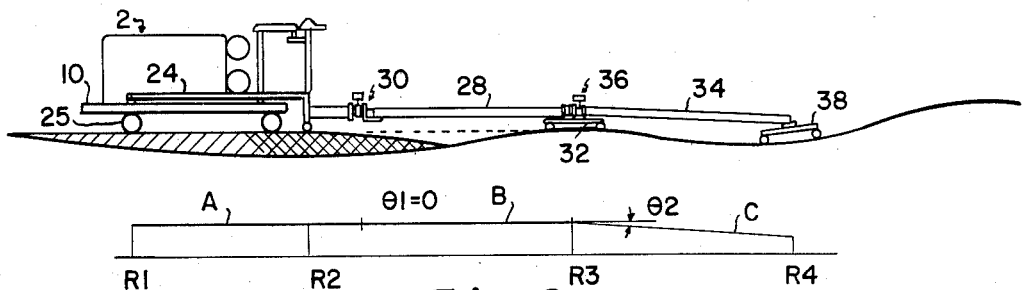

The smoothing machine 2 is positioned with its rear portion on a previously smoothed, level surface or track. This smoothed, level surface will at times hereinafter be referred to as the datum line. The reference beam 24 is pivotally secured to the vehicle frame 10 above the vehicle rear wheels and assumes a given elevation above the datum line at reference point R1. The front portion of the reference beam 24 at the jacking position, adjacent to the connection of beam 24 to sensor beam 28, assumes a second elevation relative to the datum plane and is referred to as reference point R2. As illustrated in FIGURE 1, the front of vehicle extends down into a depression and the longitudinal line of the reference beam 24 is not parallel to the surface therebeneath. The front end of beam 28 assumes a third elevation relative to the datum line at reference point R3, and the front end of the second sensor beam 34 assumes a fourth elevation relative to the datum line at reference point R4. Beneath FIGURE 1, there is a line diagram having lines indicating the reference beam 24, sensor beam 28 and sensor beam 34. The lines are identified as A, B, and C respectively. The relative vertical angle between an extension of line A and line B is indicated as $\theta_1$ and between an extension of line B and line C is indicated as $\theta_2$. The sensing means in pivotal connection 30 measures the angle $\theta_1$ and the sensing means in pivotal connection 36 measures the angle $\theta_2$. A circuit to be later explained discriminates between the relative elevations of the reference points R3 and R4. If R3 is at a higher elevation (FIGURE 1), angle $\theta_2$ is not considered in determining the amount of raise required beneath reference point R2. The sensing device in pivot connection 30 therefore indicates that the surface beneath reference point R2 must be raised an amount proportional to the angle $\theta_1$ for the reference beam 24 to be in parallel relation with a plane containing reference points R1, R2 and the higher of points R3 and R4. When the beam is parallel to the aforementioned plane, it is also parallel to the surface therebeneath and a smooth surface condition exists beneath R1 and reference points R2 and a linear arrangement of this smooth surface exists with the higher reference point in front of the vehicle. This surface is raised as indicated by the double cross hatched portion illustrated in FIGURE 2. Note, in FIGURE 2 the plane indicated by line A is parallel to the plane of line B. This indicates a smooth surface between reference point R1 and reference point R2. The surface at reference point R2 as illustrated in FIGURE 2, is now tangent to the high spot of the surface in front of the machine 2 at R3.

Figure 3:
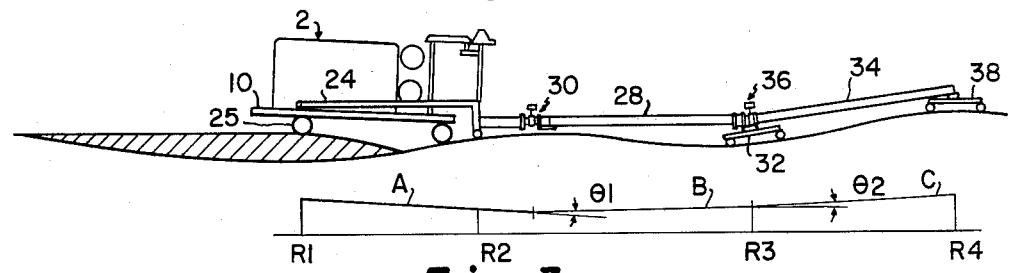
Figure 4:
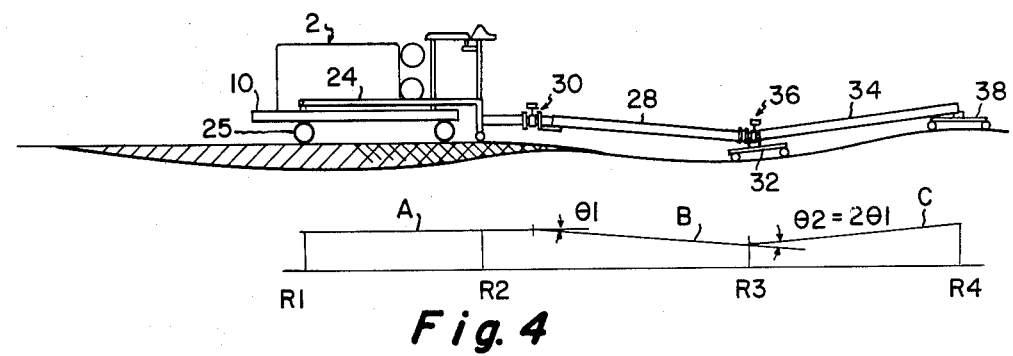

As illustrated in FIGURE 3, reference point R4 is higher than reference point R3. In this condition, the sensors in both pivot connections 30 and 36 are considered. The surface beneath reference point R2 is raised until the angle $\theta_2$ equals to twice $\theta_1$. When these angles are obtained, as illustrated in FIGURE 4, the surface beneath reference point R2 will lie on a tangent to reference point R4 at the front end of the sensor beam 34. The theory and details of the circuit employed to provide the desired sensing of the surface at various points is more fully set forth in co-pending application S.N. 32,961 and is incorporated herewith by reference.

The sensing device is calibrated by positioning the machine on a section of smooth track which is known to be level and smooth. The potentiometers in pivotal connections 30 and 36 are adjusted to give a zero or null reading on the indicator device.

It should also be noted that for this description beams 28 and 34 are of substantially the same length. The relationship of the length of the sensing beams and the angles therebetween is more fully set forth in co-pending application S.N. 32,961.

*Floating reference beams*

Figure 5:
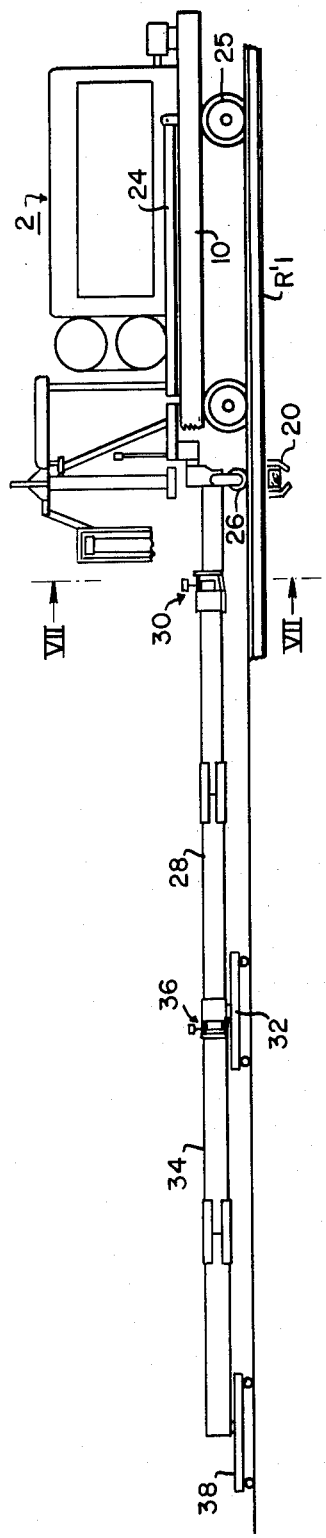
FIGURE 5 is a view in side elevation illustrating our improved reference beam secured to the rear portion of the tamping machine.
Figure 10:
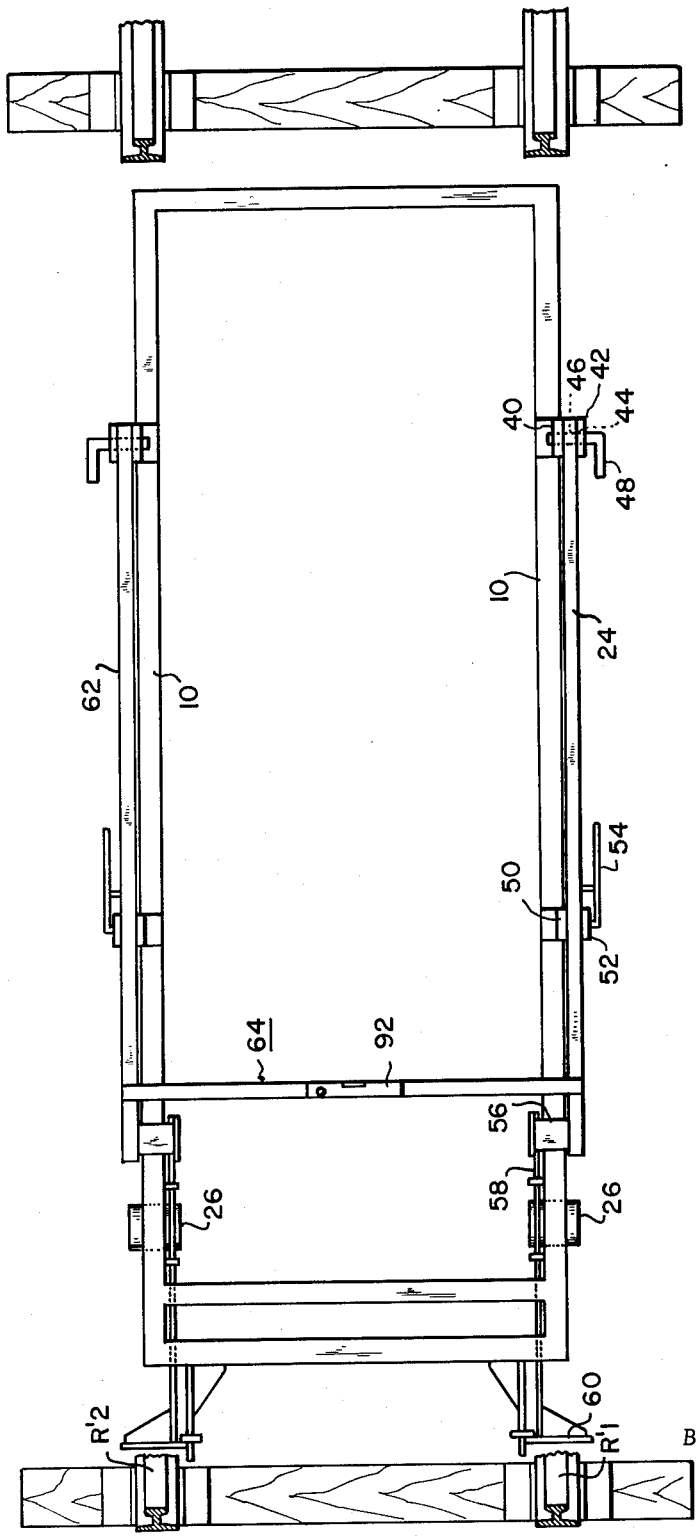
FIGURE 10 is a top plan view of the machine illustrated in FIGURE 5.

FIGURES 5 and 10 illustrate in detail the arrangement of the reference beam 24 on the railway track smoothing machine 2. The frame 10 has a pair of upwardly extending flanges 40 and 42 with pivot pin apertures 44 therethrough. The reference beam 24 has an aperture 46 therethrough and pivot pin 48 extends through the respective apertures and pivotally secures the beam 24 to the frame 10. A pair of vertical guides 50 and 52 extend upwardly from frame 10 and serve to maintain the beam 24 in longitudinal relation with frame 10. A lock 54 is arranged to rigidly secure the beam 24 to frame 10 when the machine 2 is traveling along the track and the sensor device is not in use. The beam 24 has an inward plate extension 56 which is in overlying relation with the frame 10. A vertical plate 58 is rigidly connected to the lateral plate 56 and extends forwardly therefrom beneath the frame 10 forming an integral portion of the reference beam 24. A vertical front plate 60 is secured to plate 58 and serves as a means to connect the reference beam 24 to the pivot connection 30, as later described. The reference beam 24 is arranged in general overlying relation with rail R'1 as indicated in FIGURE 10. A second reference beam 62 is pivotally connected in a similar manner to the opposite side of frame 10 in overlying relation with rail R'2. The beams 24 and 62 are both supported above the respective rails R'1 and R'2 by means of a wheeled support 26. Thus, beams 24 and 62 are independently connected to the frame 10 to indicate the relative elevation of the respective rails in respect to the desired grade line at the wheeled supports 26. A cross level member 64 is connected to beams 24 and 62 to indicate the relative planar relationship of the rails adjacent the wheeled supports 26. It should be noted, as illustrated in FIGURE 5, that the wheeled structure 26 supporting the front end of reference beams 24 and 62 is positioned above the tie being tamped or as nearly so as is practical. This is schematically illustrated by the relative position of the tamper 20 and the wheeled support structure 26.

Figure 6:
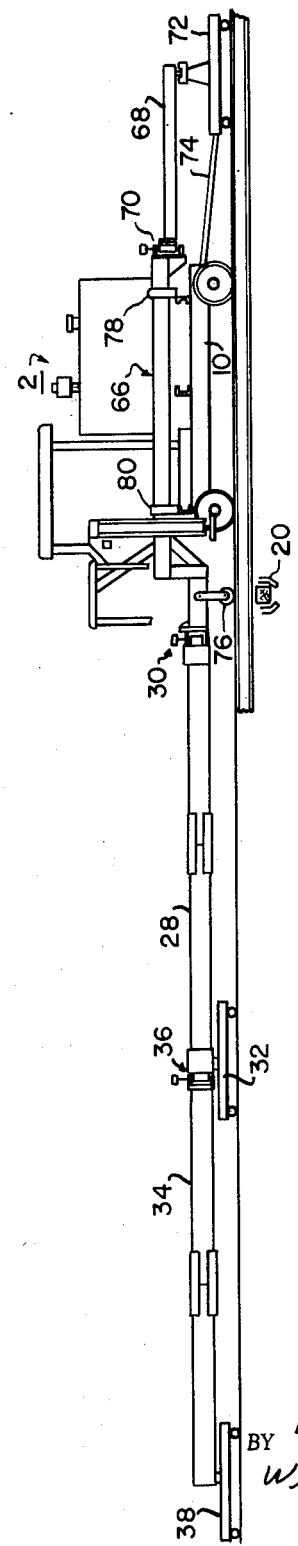
FIGURE 6 is a view in side elevation illustrating another embodiment of our reference beam wherein the rear reference point extends rearward of the tamping machine.

Another embodiment of our free floating beam is illustrated in FIGURES 6, 8 and 9. The reference beam 66 is independent of the frame 10 of vehicle 2 and is movable vertically relative thereto. The reference beam 66 has an auxiliary beam 68 that is pivotally connected to the main beam 66 by a connecting member 70. The beam 68 is connected to beam 66 for horizontal pivotal movement but is not movable vertically relative to beam 66. The auxiliary beam 68 is supported at its rear end above the rail by means of a cart 72. The beam 68 is supported in a manner that it pivots horizontally relative to the cart 72 so that the floating beam structure may be employed on curved track. A draw bar 74 connects the cart 72 to the frame 10 by means of loose connections to permit vertical movement of the cart 72 relative to the vehicle frame 10. The reference beam 66 is supported from its front end by a wheeled support 76 which is positioned above the tie being tamped in a manner similar to the wheeled support 26 in FIGURE 5. The machine 2 has vertical guides 78 and 80 arranged to guide reference beam 66 and maintain longitudinal alignment of beam 66 with the rail therebeneath. A similar reference beam 84 is connected to the opposite side of the machine 2 in overlying relation with the other rail and a cross level member 82 is connected between reference beams 66 and 84. The cross level member 82 is similar to cross level member 64 and is arranged to indicate the relative planar relation between the rails at the jacking position.

Cross level indicator

Figure 12:
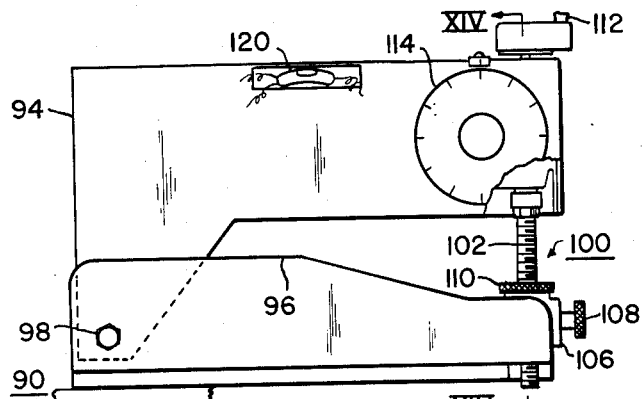
FIGURE 12 is a view in front elevation of the cross level sensor.
Figure 13:
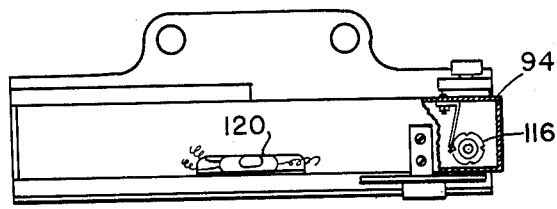
FIGURE 13 is a top plan view of the cross level sensor illustrated in FIGURE 12.
Figure 14:
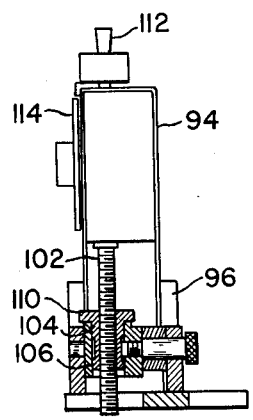
FIGURE 14 is a view taken along the line XIV—XIV of FIGURE 12.

Cross level members 64 and 82 are similar in construction and function in the same manner. Cross level member 64 (FIGURES 7 and 10) has a pair of vertical rods 86 and 88 secured at their lower ends to respective reference beams 24 and 62 extending upwardly therefrom. A cross beam 90 is pivotally secured at its ends to the respective rods 86 and 88 so that the beam 90 assumes a lateral slope substantially the same as the lateral slope between the rails beneath the front end of the reference beams 24 and 62. Connected to the cross beam 90 is a cross level indicator or sensor generally designated by the numeral 92. The cross level indicator (FIGURES 12, 13 and 14) has a body portion 94 pivotally secured to a base portion 96 by pivot connection 98. The base portion 96 is rigidly affixed to the lateral beam 90. An adjustment mechanism 100 maintains the body portion 94 in predetermined relationship with the base portion 96 and includes a threaded shaft 102 rotatably secured to and extending from the body portion 94. The base 96 has an internally threaded sleeve-like adjusting gland 104 which receives shaft 102 therein. The adjusting gland 104 is rotatably secured in a receiver 106 which is pivotally connected to base 96. A lock screw 108 extends through receiver 106 and is arranged to prevent rotation of adjusting gland 104 relative to base 96 except during calibrating. The adjusting gland 104 has a knurled flange portion 110 to facilitate manual rotation of the gland 104 relative to shaft 102 during calibration of the cross level indicator 92. The shaft 102 has a handle 112 which permits rotation of shaft 102 in the gland 104. A dial 114 is mechanically linked to shaft 102 and serves to indicate the deviation inserted into the indicator for super grade as will be later described. The shaft has a disc 116 (FIGURE 13) secured thereto and rotatable therewith. The disc has slots at 90 degree intervals and a spring member secured to the body portion 94 restricts rotation of the rod 102 and indicates when the spring end portion is in one of the slots. Secured to the body portion 94 is a level sensor 120 to indicate electrically, deviation from a horizontal plane. The sensor 120 is an electrolytic potentiometer as will be later explained in connection with the circuit diagrams. A conventional bubble level, not shown, is also attached to give visual indication of deviation from a horizontal or specific reference plane.

To adjust the cross level indicator, the railway track smoothing machine is positioned on smooth track with both rails in the same horizontal plane. Handle 112 is rotated to position dial 114 at zero. The lock screw 108 is retracted, gland 104 is rotated in receiver 106 to move threaded shaft 102 vertically therein until the bubble level indicates a level position. Lock screw 108 is then threaded into abutting relation with gland 104 to prevent rotation of gland 104 relative to receiver 106. The indicator device 92, and therefore electrolytic potentiometer 120, are then parallel to a horizontal plane.

A correction factor for super grade elevation can be inserted into the cross level indicator 92. The longitudinal dimension of the indicator 92 is such that it is proportional to the dimension between the rails by a given factor. The threads of the shaft 102 are of a predetermined pitch so that a complete revolution of the handle 112 will change the elevation of the indicator body portion 94 relative to the base 96 so that a slope equivalent to a ¼" rise of one rail in respect to the other is required for the bubble level and sensor 120 to indicate a level position. Thus, where it is desired to have one rail at a predetermined elevation relative to the other, a precise correction factor can be included in the indicator and the track raising operation may proceed as on level track with a level indication on the bubble level 120 thereby indicating a ¼" slope between rails.

Pivot connection

Figure 11:
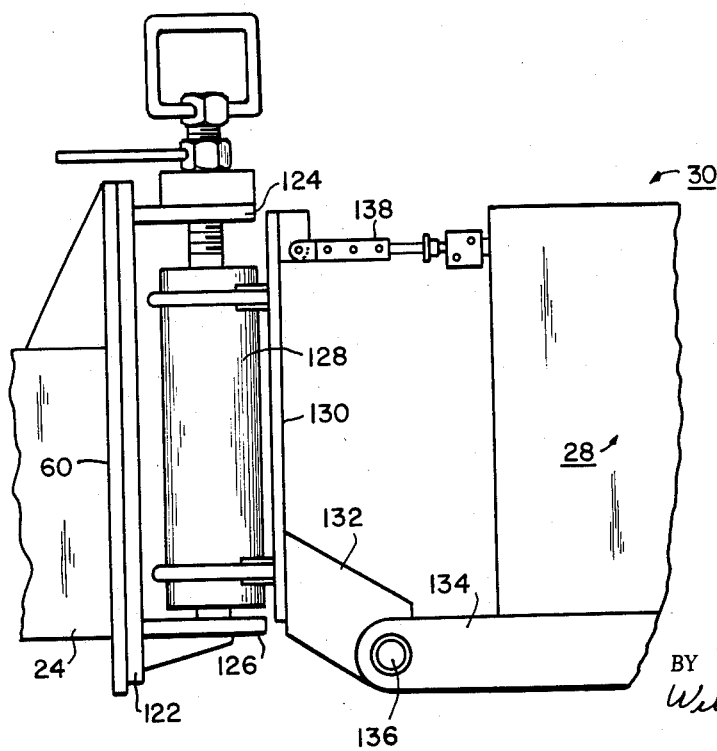
FIGURE 11 is a fragmentary view in side elevation of the pivot connection between the reference beam and the sensor beam.

The pivot connections generally designated by the numerals 30 and 36 are similar in construction and pivot connections 30 (FIGURE 11) will be described in detail. The reference beam front plate 60 has a vertical plate 122 secured thereto in a conventional manner. The plate 122 has a pair of spaced horizontal plates 124 and 126 extending therefrom which form a part of a horizontal pivot mechanism 128. Extending from the vertical plate 130 of the horizontal pivot mechanism 128 is vertical pivot arm 132. The sensor beam 28 has a mating pivot arm 134 extending rearwardly therefrom. Pivot pin 136 suitably connects pivot arms 132 and 134 for vertical pivoting movement between the reference beam 24 and the sensor beam 28. A precision linear potentiometer 138 is connected between the horizontal pivot mechanism 128 and the sensor beam 28. Therefore, the relative vertical angular deflection of sensor beam 28 in relation to reference beam front plate 60 is indicated by the wiper arm of potentiometer 138. A suitable stop mechanism may also be provided to limit pivotal movement of the beam 28 relative to horizontal pivot mechanism 128 to protect the potentiometer 138.

Control circuits

Figure 15:
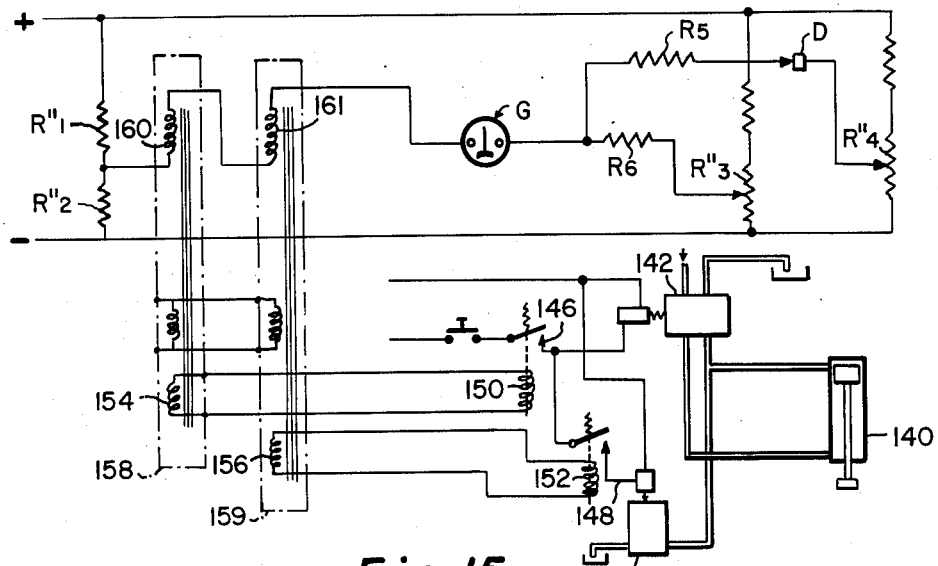
FIGURE 15 is a schematic electrical circuit illustrating the control for the jack adjacent the reference rail having the sensor beams positioned thereon.

The control circuit for the jacking mechanism operable to raise the rail beneath the reference beam 24 and the sensing devices in pivot connections 30 and 36 is diagrammatically illustrated in FIGURE 15. The electrical circuit illustrated in FIGURE 15 comprises a double Wheatstone bridge in which one branch comprises two fixed resistances R″1 and R″2 and each of the other branches includes potentiometers R″3 and R″4. The potentiometer R″3 is potentiometer 138 previously described, and R″4 is an identical potentiometer located similarly at pivot connection 36. The potentiometers and the fixed resistances are connected in parallel across a source of current. The potentiometer R″3 is varied according to the angular relationship between the reference beam 24 and the first sensing beam 28 and indicates the angle $\theta_1$. R″4 is the potentiometer that senses the angular relationship between the first sensing beam 28 and the second sensing beam 34 and indicates the angle $\theta_2$. When angle $\theta_1$ is zero, the wiper mechanism contact is located on potentiometer R″3 at the point of the same potential as at the junction of R″1 and R″2 so that the potential at both sliders is the same and no current flows in galvanometer G. When angle $\theta_2$ is negative, as illustrated in FIGURE 1, the diode D prevents current flow to the galvanometer G; however, current will flow when $\theta_2$ is positive.

When angle $\theta_2$ is positive, reference point point R4 is higher than reference point R3. Under these conditions, the voltage impressed on galvanometer G by potentiometers R″3 and R″4 is their algebraic summation. To obtain the position indicated in FIGURE 4 for the reference beam 24, both angles $\theta_1$ and $\theta_2$ must be considered and $\theta_2$ must equal twice $\theta_1$, with $\theta_1$ negative and $\theta_2$ positive. At the position where $\theta_2$ equal twice $\theta_1$, no current flows through galvanometer G. This is accomplished in the circuit by having resistance R6 as one-half the value of resistance R5. Therefore, with the condition depicted in FIGURE 4 and the relationship of $\theta_2$ equals $2\theta_1$ is present, no current flows through the galvanometer G. A slight differential angular deviation results in a small amount of current and a large deviation results in a large current. Although the output current of the galvanometer is discussed as large and small, it should be understood these terms are used in their relative sense. The current output is measured in microwatts and is too low a power value for direct control. Therefore, as later discussed, the power output is amplified for control purposes.

The jack cylinder 140 illustrated in FIGURE 15 is controlled by means of two solenoid actuated valves 142 and 144. The first is a jack valve 142 which supplies oil at a fixed volume to the cylinder of the jack 140 from a suitable source. The second valve 144 is a bleed valve which bleeds off at a predetermined rate from the supply coming from the source through the jack valve 142. Thus, when the jack valve 142 is open and the bleed valve 144 is open, the jack is extended at a slower rate than when bleed valve 144 is closed. Relay switches 146 and 148 are provided to control the jack valve 142 and bleed valve 144.

Under conditions when a large raise is required, both switches 146 and 148 are closed thus opening jack valve 142 and maintaining bleed valve 144 closed. In this manner full oil flow is supplied to the jack 140. As the current output from galvanometer G decreases (indicating the rail is approaching grade), the switch 148 is opened and bleed valve 144 is opened to thus reduce the flow of oil to the jack 140 and reduce the rate at which the jack is being extended.

The relay switches 146 and 148 have coils 150 and 152 associated therewith. The energization of respective coils 150 and 152 closes the respective switches 146 and 148 in a conventional manner. The coils 150 and 152 are connected to the corresponding coils 154 and 156 in amplifiers 158 and 159. The amplifiers 158 and 159 include the control coils 160 and 161 which are connected in series with galvanometer G previously described. Thus, the current through control coils 160 and 161 is amplified by amplifiers 158 and 159 and the amplified output is transmitted from respective output coils 154 and 156 to respective actuating coils 150 and 152 of relay switches 146 and 148.

The automatic control system operates as follows: Assuming the condition illustrated in FIGURE 1 is present and angle $\theta_1$ is substantial, a large raise in the surface at reference point R2 is required. The wiper arm of potentiometer R″3 is moved by means of the angular relationship between reference beam 24 and sensor beam 28 so that a large amount of current passes through galvanometer G. Control coils 160 and 161 in amplifiers 158 and 159 are also responsive to this current flow. The amplifiers 158 and 159 through output coils 154 and 156 transmit the signal of the high current flow and thereby energize respective coils 150 and 152 to close both solenoid actuator switches 146 and 148. The closing of switches 146 and 148 opens valve 142 and closes valve 144. Hydraulic fluid at a fixed volume flows through valve 142 and to jack cylinder 140 extending the same at a fixed rate.

As the wiper arm of resistance R″3 moves toward the electrical center or null position, the current flowing through galvanometer and to control coils 160 and 161 is reduced. The reduction in current is transmitted through the amplifiers and output coils 154 and 156 and the output is insufficient in coil 152 to maintain switch 148 in a closed position. Switch 148 is therefore opened which opens valve 144 and bypasses a portion of the fixed volume of oil being supplied to the jack cylinder 140. This reduces the rate at which the jack 140 is extending. As the wiper arm of potentiometer R″3 centers itself and the flow of current through galvanometer G and coils 160 and 161 stops the low speed relay switch 146 is opened thus closing valve 142. This stops the flow of fluid to jack cylinder 140 and the jacking operation stops. In this manner the reference rail, that is the rail associated with the sensor beams 28, 34 and the reference beam 24, is thus leveled.

Figure 16:
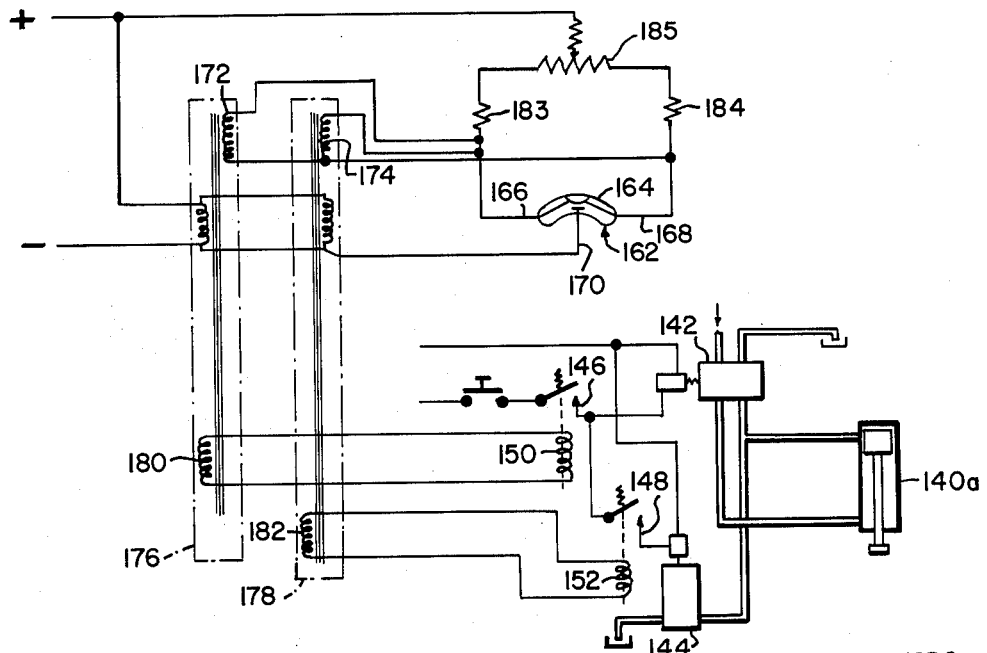
FIGURE 16 is a schematic circuit diagram on the control for the jack adjacent the cross-level rail.

The circuit for the lateral sensing means and control for the jack which raises the cross-level rail is schematically illustrated in FIGURE 16. The cross level circuit includes an electrolytic potentiometer 162. The electrolytic potentiometer 162 is in many respects similar to a bubble level and consists of a curved glass tube 164 containing a current conducting liquid and an air bubble. Into each end of the tube 162 there is inserted an electrode 166 and 168. The electrodes extend upwardly and penetrate the air bubble. A third electrode, called the common electrode 170, is positioned in the current conducting liquid at the bottom of the tube. In a horizontal position the electrodes 166 and 168 are partially immersed in the current conducting liquid and have substantially the same resistance to the common electrode 170. As the curved glass container 164 is tilted a greater portion of one of the electrodes 166 or 168 is immersed in the conducting liquid to a greater length than the other. This changes the relative resistance of the electrodes 166 and 168 to the common electrode 170. The electrolytic potentiometer forms one-half of a bridge circuit with two fixed resistances 183 and 184 as the other half of the bridge. Potentiometer 185 is used to electrically adjust the bridge circuit when the machine is located on a section of track known to be level. By adjusting potentiometer 185 the bridge circuit is balanced and the cross level has a zero reading. When a section of track is encountered in which the opposed rails are not located in the desired relation to one another, the glass container 164 of the electrolytic potentiometer 162 is tilted and the relative resistances of electrodes 166 and 168 to electrode 170 change, thereby unbalancing the bridge circuit. By measuring the relative unbalance of the bridge circuit the condition of level of the curved glass vial 164 can be measured. The output of the bridge circuit is connected through a pair of control coils 172 and 174. The deviation from the horizontal position is thus measured by the relative current output to coils 172 and 174. The coils 172 and 174 are a part of amplifiers 176 and 178. The amplifiers 176 and 178 contain output coils 180 and 182 that are responsive to control coils 172 and 174 respectively.

The jack control circuit for the jack 140a which raises the cross-level rail is similar to the control circuit discussed in FIGURE 15. Accordingly, similar numerals will designate similar parts. The control for the rate at which the piston is extended from cylinder 140a is similar to that for cylinder 140. It should be understood however that separate independent controls are provided for cylinders 140a and 140. The fact that separate controls are provided does not mean the control systems do not operate simultaneously. The control systems are dependent on their respective sensing devices. Also, a pressure control mechanism may be provided which includes a pressure actuated switch in each control circuit. The pressure actuated switch requires both of the jacks to be on firm ballast before actual track raising takes place. This results in substantial simultaneous raising of both rails with the cross level rail lagging slightly behind the reference rail.

The operation of the cross level control system is as follows: After the reference rail is raised a predetermined distance, as indicated by the twin beam sensing device, the cross-level rail is at slight elevation below that of the reference rail. The electrolytic potentiometer 162 which is connected to the cross leveling device will indicate a cross level error; that is, the air bubble will not be centered and one of the electrodes will be immersed in the conducting liquid to a greater extent than the other electrode. Depending upon the degree of slope between the respective rails, the relative change in resistance between the electrodes 166 and 168 to the common electrode will be indicated by the current flow from the bridge circuit to the respective control coils 172 and 174. When a substantial rise of the cross-level rail is indicated by the current flow, output coils 180 and 182 will energize coils 150 and 152 to close relay switches 146 and 148 respectively. Switch 146 opens solenoid valve 142 and relay switch 148 closes solenoid valve 144. Thus, hydraulic fluid at a fixed volume is introduced through valve 142 into jack cylinder 140a to extend the same at a predetermined rate. As the cross-level rail is raised and approaches the desired elevation in respect to the reference rail, the relative resistances between electrodes 166 and 168 and common electrode 170 changes so that current output to control coils 172 and 174 is decreased. The decreasing in output is transmitted through output coils and opens switch 148. Switch 148 in turn opens solenoid valve 144 which permits a fixed volume of hydraulic fluid to bypass jack cylinder 140a and thus reduces the rate at which the piston extends from the cylinder. When the electrolytic potentiometer 162 indicates that the cross-level rail is in the desired planar relationship to the reference rail, no current flows to control coils 172 and 174 and relay switch 146 is opened thus closing valve 142 and stopping the operation of jack 140a.

It will be appreciated that the control circuits provide a means to control the rate at which the piston extends from the cylinder 140a. If the piston 140 is on soft ballast and settles into the ballast instead of actually raising the adjacent rail, the control circuit for the other jack 140a will reduce the rate at which the other rail is being raised until the first jack firmly seats itself in the ballast.

One advantageous feature of our control system is the fact that the final adjustment of cross level is accomplished electrically and is more accurate than a mechanical adjustment for final cross level.

According to the provisions of the patent statutes, we have explained the principal preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:

1. A machine to indicate surface irregularities comprising, a vehicle, a reference beam having a front end portion and a rear end portion, said reference beam positioned in overlying relation to said vehicle, said beam front end portion being movable vertically relative to said vehicle, support means connected to said reference beam rear end portion and operable to maintain said reference beam rear end portion at a predetermined elevation above the surface therebeneath, second support means connected to said reference beam front end portion and operable to maintain said reference beam front end portion at a predetermined elevation above the surface therebeneath, a first sensor beam pivotally connected to the front end of said reference beam and extending longitudinally therefrom, said first sensor beam being pivotal vertically relative to said reference beam, third support means connected to said first sensor beam front end portion and operable to maintain said first sensor beam front end portion at a predetermined elevation above the surface therebeneath, first sensing means between said reference beam and said first sensor beam to indicate relative vertical angularity between said reference beam and said first sensor beam.

2. A machine to indicate surface irregularities comprising a vehicle, a reference beam positioned on said vehicle and extending forwardly therefrom, pivot means connecting said reference beam to said vehicle for vertical pivotal movement of said beam relative to said vehicle, support means for said reference beam secured thereto in spaced relation to said pivot means, said vehicle and said support means operable to support said reference beam and thereby provide a reference plane, a first sensor beam pivotally connected to and extending longitudinally from said reference beam, said first sensor beam being pivotally vertically relative to said reference beam, said sensor beam serving as a second plane, first sensing means between said reference beam and said first sensor beam to indicate relative vertical angularity between said reference plane and said second plane.

3. A machine to indicate surface irregularities as set forth in claim 1 in which said support means connected to said reference beam rear end portion is spaced rearwardly of said vehicle, and means to pivot said reference beam horizontally relative to said support means.

4. A machine to indicate surface irregularities as set forth in claim 1 which includes a second sensor beam pivotally secured to the front end of said first sensor beam and extending longitudinally therefrom, said second sensor beam being pivotally movable in a vertical direction relative to said first sensor beam, fourth support means connected to the front end portion of said second sensor beam and operable to maintain said second sensor beam front end portion at a predetermined elevation above the surface therebeneath, second sensing means between said first sensor beam and said second sensor beam to indicate the relative vertical angularity therebetween.

5. A machine to indicate surface irregularities as set forth in claim 1 which includes a lateral sensor means associated with said vehicle, said lateral sensor means being responsive to the lateral slope of said vehicle.

6. A machine to indicate surface irregularities as set forth in claim 1 which includes a lateral reference beam associated with and extending laterally from said first named reference beam adjacent said second support means, support means for said lateral reference beam spaced laterally from said first named reference beam, and lateral sensor means positioned on said lateral reference beam, said lateral sensor beam being responsive to the lateral slope of said lateral reference beam.

7. A machine to indicate surface irregularities as set forth in claim 1 which includes a second reference beam positioned in lateral spaced relation with said first reference beam, said second reference beam front end portion being movable vertically relative to said vehicle, fourth support means connected to said second reference beam rear end portion and operable to maintain said second reference beam rear end portion at a predetermined elevation above the surface therebeneath, fifth support means connected to said second reference beam front end portion and operable to maintain said second reference beam front end portion at a predetermined elevation above the surface therebeneath, a lateral reference beam supported by and extending between both of said reference beams, and lateral sensor means positioned on said lateral reference beam, said lateral sensor means being responsive to the lateral slope of said lateral reference beam.

8. A railway track smoothing machine including a vehicle, said vehicle being mounted on wheels for movement along the rails of the track, said vehicle having means to separately raise both rails therebeneath, a reference beam having a front end portion and a rear end portion, said reference beam positioned in overlying relation with said vehicle in substantially parallel overlying relation with said first rail beneath said vehicle, support means connected to said reference beam rear end portion and operable to maintain said reference beam rear end portion a predetermined distance above said first rail therebeneath, said reference beam front end portion being movable vertically relative to said vehicle, said reference beam rear end portion serving as a first rear elevation point for said machine, second support means connected to said reference beam front end portion and operable to maintain said reference beam front end portion at a predetermined elevation above said first rail therebeneath, said reference beam front end portion serving as a second elevation reference point for said machine, a first sensor beam pivotally connected to the front end of said reference beam and extending longitudinally therefrom in overlying spaced relation with said first rail, said first sensor beam being pivotal vertically relative to said reference beam, third support means connected to said first sensor beam front end portion and operable to maintain said first sensor beam front end portion at a predetermined elevation above said first rail, said first sensor beam front end portion serving as a third elevation reference point for said machine, first sensing means between said reference beam and said first sensor beam to indicate relative vertical angularity between said reference beam and said first sensor beam, and said means for raising said first rail being responsive to said first sensor means to raise said first rail adjacent to said second reference point until said reference beam and said first sensor beam are in substantially parallel planes.

9. A railway track smoothing machine as set forth in claim 8 which includes a lateral sensor means associated with said vehicle, said sensor means being responsive to the lateral slope of said vehicle, and said means for raising said second rail being responsive to said lateral sensor means to raise a portion of said second rail at a location laterally of said second reference point until said first and second rails at said second reference point are in a predetermined lateral plane.

10. A railway track smoothing machine as set forth in claim 8 which includes a second reference beam having a front end portion and a rear end portion, said second reference beam positioned in overlying relation with said vehicle in substantially parallel overlying relation with said second rail beneath said vehicle, fourth support means connected to said second reference beam rear end portion and operable to maintain said second reference beam rear end portion a predetermined distance above said second rail therebeneath, said second reference beam front end portion being pivotal vertically relative to said vehicle, fifth support means connected to said second reference beam front end portion and operable to maintain said second reference beam front end portion at a predetermined elevation above said second rail therebeneath, said second reference beam front end portion serving as a lateral reference point for said machine, a lateral reference beam supported by and extending between both of said reference beams, and lateral sensor means positioned on said lateral reference beam, said lateral sensor means being responsive to the lateral slope of said lateral reference beam.

11. A railway track smoothing machine as set forth in claim 10 in which said means to separately raise said rails beneath said vehicle includes means to clamp said vehicle to both of said rails, first power operated jack means to raise said first rail and second power operated jack means to raise said second rail.

12. A railway track smoothing machine as set forth in claim 11 which includes circuit means including said first sensor means and said lateral sensor means whereby said first power operated jack means is actuated in response to said first sensor means to raise said first rail and thereafter said second power operated jack means is actuated in response to said lateral sensor means to actuate said second power operated jack means to raise said second rail.

13. A railway track smoothing machine as set forth in claim 11 which includes speed regulating means for said first power operated jack means, and means associated with said first sensor means to decrease the speed of said first power operated jack means as said reference beam and said first sensor beam approach parallel planes.

14. A railway track smoothing machine as set forth in claim 11 which includes speed regulating means for said second power operated jack means, and means associated with said lateral sensor means to decrease the speed of said second power operated jack means as said second rail approaches the predetermined lateral planar relationship with said first rail.

15. A railway track smoothing machine as set forth in claim 8 which includes a second sensor beam pivotally connected to the front end of said first sensor beam and extending longitudinally therefrom in overlying spaced relation with said first rail, said second sensor beam being pivotal vertically relative to said first sensor beam, fourth support means connected to said second sensor beam front end portion and operable to maintain said second sensor beam front end portion at a predetermined elevation above said first rail, said second sensor beam front end portion serving as a fourth elevation reference point for said machine, second sensing means between said first sensor beam and said second sensor beam to indicate relative angularity between said first sensor beam and said second sensor beam, and said means for raising the first rail being responsive to said first and second sensing means to raise said first rail adjacent to said second reference point until said reference beam assumes a predetermined planar relationship with said rail therebeneath.

16. A surface smoothing machine comprising a vehicle, means to raise the surface beneath said vehicle at a first predetermined location, longitudinal surface sensing means affixed to said vehicle and extending forwardly therefrom adjacent said first predetermined location, said longitudinal surface sensing means including means to provide a signal proportional to the amount of raise required for said surface at said first predetermined location, and electrical control means responsive to said signal to control said first named means.

17. A surface smoothing machine as set forth in claim 16 which includes means to raise the surface beneath said vehicle at a second predetermined location spaced laterally of said first predetermined location, lateral surface sensing means associated with said vehicle and operable to sense the relative elevation of the surface at said first and second predetermined locations, said lateral surface sensing means including means to provide a signal proportional to the amount of raise required for said surface at said second predetermined location to bring the surface at said second predetermined location into a predetermined planar relation with said first predetermined location, and electrical control means responsive to said signal from said lateral surface sensing means to control said means for raising the surface beneath said vehicle at said second predetermined location.

18. A surface smoothing machine comprising a lateral surface sensing mechanism, means supporting said mechanism in a predetermined position above the surface with respect to two laterally spaced predetermined locations on the surface, level sensing mechanism associated with said lateral surface sensing mechanism and operable to provide an electrical signal proportional to the amount of deviation from a predetermined planar relation of said surface at said two predetermined locations.

19. A surface smoothing machine as set forth in claim 18 which includes means to change the elevation of said surface at one of said predetermined locations so that said surface at said locations is in a predetermined planar relation, and electrical control means responsive to said electrical signal from said level sensing mechanism to control said means to change the elevation of said surface.

20. A railway track smoothing machine comprising a vehicle, jack means to raise at least one of the rails, longitudinal surface sensing means affixed to said vehicle and associated with one of said rails, said longitudinal surface sensing means including means to provide an electric signal proportional to the amount of raise required for said rail, actuator means for said jack means, and electrical control means responsive to said signal to control said actuator means.

21. A railway track smoothing machine comprising a vehicle, jack means to raise both of said rails, longitudinal surface sensing means associated with a first rail, said longitudinal surface sensing means including means to provide an electrical signal proportional to the amount of raise required for said first rail at a predetermined location, lateral surface sensing means responsive to the elevation of the second rail opposite said first rail at said predetermined location, said lateral surface sensing means including means to provide an electrical signal proportional to the amount of raise required for said second rail to bring said second rail up to a predetermined elevation relative to said first rail at said predetermined location, and control means responsive to said electrical signals to control said jacking means to raise said respective rails.

22. The method of detecting and reducing undulations in a surface comprising the steps of continuously checking said surface until an electric signal is obtained from a surface sensing device indicating a raise is required in said surface at a specific location, controlling said signal so that the signal is proportional to the amount of raise required to raise the surface at said specific location to a predetermined elevation, transmitting said signal directly to control means for surface raising means located adjacent said specific location, raising the surface, controlling the raising of the surface in accordance with the intensity of the signal and stopping the raising when the signal indicates that the surface has reached a predetermined elevation.

23. The method of detecting and reducing undulations in a surface comprising the steps of continuously checking said surface until a first signal is obtained from a longitudinal surface sensing device indicating a raise in the surface is required at a first specific location, controlling said first signal so that it is proportional to the amount of raise required to raise the surface at the first location to a first predetermined elevation, transmitting said first signal directly to first control means for surface raising means located adjacent said first location so that said signal controls said first surface raising means, obtaining a second signal from a lateral surface sensing device indicating a raise in the surface is required at a lateral location, controlling said second signal so that it is proportional to the amount of raise required to raise the surface at said lateral location to a second predetermined elevation, transmitting said second signal to second control means for second surface raising means located adjacent said lateral location so that said lateral sensing means controls said second surface raising means and raising the surface at said first location and said lateral location until it reaches respectively said first and second elevations.

References Cited by the Examiner

UNITED STATES PATENTS

| 2,268,017 | 12/41 | Busick et al. | |
|---|---|---|---|
| 3,041,982 | 7/62 | Plasser et al. | 104—7 |
| 3,071,082 | 1/63 | Talboys | 104—12 |
| 3,103,182 | 9/63 | Plasser et al. | 107—7 |
| 3,111,907 | 11/63 | Plasser et al. | 104—7 |

FOREIGN PATENTS

| 615,529 | 2/61 | Canada. |
|---|---|---|
| 1,225,377 | 2/60 | France. |
| 1,250,766 | 12/60 | France. |
| 355,468 | 8/61 | Switzerland. |

OTHER REFERENCES

Publication: Railway Track and Structures, July 1961, page 40.

ARTHUR L. LA POINT, *Primary Examiner.*

LEO QUACKENBUSH, EUGENE G. BOTZ, *Examiners.*

UNITED STATES PATENT OFFICE

CERTIFICATE OF CORRECTION

Patent No. 3,212,451

October 19, 1965

Richard B. Doorley et al.

It is hereby certified that error appears in the above numbered patent requiring correction and that the said Letters Patent should read as corrected below.

Column 1, line 19, for "should preferably sense" read -- that accurately indicates --; same line 19, for "or" read -- of the --; column 5, line 38, after "vehicle" insert -- 2 --; column 8, line 65, strike out "point", second occurrence.

Signed and sealed this 2nd day of August 1966.

(SEAL)
Attest:

ERNEST W. SWIDER
Attesting Officer

EDWARD J. BRENNER
Commissioner of Patents